United States Patent
Smith et al.

(10) Patent No.: US 11,063,829 B2
(45) Date of Patent: Jul. 13, 2021

(54) SECURE COLLABORATIVE DATA COMMUNICATIONS NETWORK

(71) Applicant: SECIP Holdings PTY Ltd, South Brisbane (AU)

(72) Inventors: Perry Smith, West End (AU); Nicholas Forbes, Thornlands (AU); James Milne, Moorooka (AU)

(73) Assignee: SECIP Holdings Pty Ltd., South Brisbane (AU)

( * ) Notice: Subject to any disclaimer, the term of this patent is extended or adjusted under 35 U.S.C. 154(b) by 27 days.

(21) Appl. No.: 16/215,224

(22) Filed: Dec. 10, 2018

(65) Prior Publication Data

US 2019/0222480 A1    Jul. 18, 2019

Related U.S. Application Data

(63) Continuation-in-part of application No. PCT/AU2017/005046, filed on May 18, 2017.

(30) Foreign Application Priority Data

Jun. 10, 2016 (AU) ................................ 2016902265
Dec. 27, 2017 (AU) ................................ 2017905203

(51) Int. Cl.
*H04L 12/24* (2006.01)
*H04L 29/06* (2006.01)

(52) U.S. Cl.
CPC .......... *H04L 41/0886* (2013.01); *H04L 41/02* (2013.01); *H04L 41/042* (2013.01);
(Continued)

(58) Field of Classification Search
CPC ............. H04L 41/0886; H04L 41/0843; H04L 41/0846; H04L 41/0806; H04L 41/042
See application file for complete search history.

(56) References Cited

U.S. PATENT DOCUMENTS 9,621,428 B1 * 4/2017 Lev ..................... H04L 41/0806
9,648,101 B2 * 5/2017 Clark ..................... H04L 67/02
(Continued)

FOREIGN PATENT DOCUMENTS

WO    2015160366    10/2015
WO    2017210720    12/2017

OTHER PUBLICATIONS

Vmware, "Virtual Appliances: A New Paradigm for Software Delivery", 2008.

*Primary Examiner* — Thomas J Dailey
*Assistant Examiner* — Lam H Duong
(74) *Attorney, Agent, or Firm* — Boyle Fredrickson S.C.

(57) ABSTRACT

A secure collaborative data communications network having a primary node, associated with a primary entity, enabling structure or collaborative features of a secondary node using template arrangements. Top level templates define an operating environment, including a network, compute and store. Next level templates define a business operating environment, including processes, apps, collaborative content (e.g., across documents), and lists. A secondary node of a secondary entity under control of the primary entity replicates collaboration of structure and/or features of the primary node. The primary node advantageously enables structure or feature collaboration using such an arrangement of templates with the secondary node replicating collaboration more rapidly compared to time-consuming manual independent configuration of both nodes that is ordinarily done. Such node replication ensures collaboration of structure and features is common amongst nodes of a network advantageously avoiding compatibility and interoperability problems amongst the nodes.

18 Claims, 4 Drawing Sheets

(52) U.S. Cl.
CPC ...... *H04L 41/0806* (2013.01); *H04L 41/0843* (2013.01); *H04L 41/0846* (2013.01); *H04L 63/04* (2013.01); *H04L 63/20* (2013.01)

(56) References Cited

U.S. PATENT DOCUMENTS

| | | | |
|---|---|---|---|
| 2003/0135565 A1* | 7/2003 | Estrada | G06Q 10/10 709/206 |
| 2003/0236693 A1* | 12/2003 | Chen | G06Q 10/10 705/7.15 |
| 2004/0034540 A1* | 2/2004 | Chen | G06Q 10/10 705/301 |
| 2005/0240591 A1* | 10/2005 | Marceau | G06F 16/10 |
| 2008/0134177 A1* | 6/2008 | Fitzgerald | G06F 21/577 718/1 |
| 2009/0172101 A1* | 7/2009 | Arthursson | H04L 67/02 709/205 |
| 2009/0300610 A1* | 12/2009 | Hicks | G06F 8/61 718/1 |
| 2010/0325624 A1* | 12/2010 | Bartolo | G06F 8/61 717/176 |
| 2014/0229440 A1 | 8/2014 | Venkatesh et al. | |
| 2015/0052524 A1 | 2/2015 | Raghu | |
| 2015/0281285 A1 | 10/2015 | Bharali et al. | |
| 2016/0087844 A1* | 3/2016 | Nair | H04L 41/0806 709/203 |

* cited by examiner

SECURE COLLABORATIVE DATA COMMUNICATIONS NETWORK

FIELD OF THE INVENTION

The present invention generally relates to a secure collaborative data communications network. The present invention has particular, although not exclusive application to military warfighter networks including tank, ship, plane and other warfighter divisions. Further use and applications exist in the National security, law enforcement and corporate arenas. Essentially, the present invention has application anywhere that a highly secure environment at every layer of the Open Systems interconnection (OSI) model is required, plus the information layer on top of the OSI model.

The present invention also has applicability to commercial use cases that require secure collaboration within a multi-node environment. Specific areas of collaboration are supported being the ability to encapsulate full business processes within an operating environment and have them instantiated through template driven definitions.

BACKGROUND OF THE INVENTION

The reference to any prior art in this specification is not, and should not be taken as an acknowledgement or any form of suggestion that the prior art forms part of the common general knowledge.

During military operations, secure collaboration networks and nodes must be rapidly established between dispersed battalions under the control of a central warfighter division. In practice, the associated collaboration nodes in the network must be manually configured which can be extremely time consuming, often taking months, before which time the military operation may have actually ended. The configuration is conventionally undertaken at many levels.

The same is true of running any secretive operation or investigation. In the case of police operations, the police officers require the ability to rapidly instantiate collaborative environments to support active operations and investigations.

There is a need for more rapid configuration of the collaboration nodes and networks.

Further, each node is often configured differently which causes compatibility and interoperability problems among nodes in the network. Also, each node may operate in a completely separate security context to the other nodes, making interchange of information difficult.

There is a need for node configuration to avoid compatibility and interoperability problems among nodes in the network.

SUMMARY OF THE INVENTION

According to one aspect of the present invention, there is provided a secure collaborative data communications network including:

a primary node, associated with a primary entity, enabling collaboration features or structure of a secondary node using a template arrangement; and the secondary node, associated with a secondary entity under control of the first entity, replicating the collaboration features or structure from the primary node;

wherein each node is virtual and includes an automated controller configured such that the stand-up and configuration of each node is a fully automated process standing up and coupling multiple nodes together, each node once stood-up able to locate other nodes on the network.

Advantageously, the primary node enables collaboration features or structure of a secondary node using the template arrangement and the secondary node replicates that collaboration which is far more rapid (e.g. minutes) when compared with manually and independently configuring both nodes from scratch (e.g. months). The ability to provide a rapid response through templated processes, at all levels of the delivered service (from compute and store, though network, data and application and presentation layers) does not currently exist. The nodes represent encapsulated security boundaries making them suitable for inter-agency low trust scenarios.

Preferably, once a node has been stood-up, secure collaborative business applications can be automatically deployed on to the node using XML based templates, the templates defining the application and being propagated from a centralised node. Even more preferably, the nodes are in one or more layers above the hardware layer of the OSI Model, and the XML based templates define Services, Applications, Data Structures, Business Applications, and/or Business Data in the form of Office Documents, Videos, Electronic forms and workflows, which underpin and support a business activity or a collection of business process.

Each virtual node may include an activity manager controller which can create secure collaboration applications based on a template defined in XML, the apps not just enabling end-user collaboration but also population of business data. The activity manager controller may also ensure user created data is tagged correctly by applying extensive metadata or tags to the user created data. The activity manager controller may provision or create an application, as well as manage and update the applications from a central location.

Preferably, each virtual node can operate:

as part of a coupled federated set of nodes when connected to the network, or independently and continue to provide access to hosted collaborative applications and content hosted on the virtual node when not connected to the network.

Furthermore, replicating to ensure that the collaboration features or structure is common among the nodes avoids compatibility and interoperability problems among nodes in the network. Each node may define an entire set of OSI layers, not just one or two, to provide a fully automated environment. So, the definition of each node may include all layers of the OSI model, plus the ability to configure data to support enterprise information management through a centralized point, fed by distributed data implementation. The standard business processes, documents, document templates, applications and other artefacts required to support these operations and investigations are preferably encapsulated within standard template definitions of the template arrangement to allow for rapid instantiation and standardization across data repositories.

The primary entity may be a military division whereas the secondary entity may be a battalion operating under the control of the military division. The features or structure may relate to operational processes of the nodes. The nodes of the federated network may act autonomously in the event of a communications breakdown. In particular, the second node, once established, may operate autonomously from the primary node.

In the case of national security and policing, the nodes may be defined in such a way that they are aware of each other and automatically enable or disable platform and microservices accordingly so that the nodes collectively operate to provide a complete secure information environment, even within poorly connected or disconnected environments.

The network may be configured to automatically apply metadata to data in both nodes using security contextual information and/or metadata rules. The network may be configured to replicate the data and the associated metadata, and/or security contextual information between the nodes so that the nodes are configured to securely search content across other nodes. Maintaining the security context of information across the nodes in this manner results in the successful operation of the node network as a whole. The term network, as used above, is not referring to a physical network but rather an information network created through an awareness and interoperability of nodes.

Preferably, the template arrangement defines everything from the platform layer (computer, datastore and network—collectively referred to as platform) through to the application and presentation layer. A template of the arrangement preferably defines the required structures, and a templating engine preferably provides the instantiation capability of the platform, the applications and the platform services, including micro-services. The templating arrangement may include a templating engine for using a template definition to automatically create the features or structure. The network may include an activity manager controller for provisioning, de-provisioning, updates and management of operational processes to facilitate collaboration, business process automation, sharing, scaling and/or configuring among the nodes.

According to another aspect of the present invention, there is provided a method for establishing a secure data communications connection between collaborating primary and secondary nodes, the method including:

the primary node, associated with a primary entity, enabling collaboration features or structure of the secondary node using a template arrangement; and the secondary node, associated with a secondary entity under control of the first entity, replicating the collaboration features or structure from the primary node;

wherein each node is virtual and includes an automated controller configured such that the stand-up and configuration of each node is a fully automated process standing up and coupling multiple nodes together, each node once stood-up able to locate other nodes on the network.

The foregoing steps are automated.

The method may further involve the step of automatically applying metadata to both nodes using contextual information and/or metadata rules. The method may further involve replicating data objects, associated metadata and/or security context between the nodes so that the nodes are configured to securely search content across other nodes. The metadata preferably provides description and contextual information around all objects and components of a node, and includes security, information management descriptors and classification data.

The method may involve creating a primary node using automated provisioning scripts. The method may involve creating a secondary node using automated provisioning scripts.

The method may involve seeding user identities into the primary node. The method may involve seeding user identities into the secondary node.

The method may involve the primary node establishing collaboration functionality between the primary and secondary nodes. The method may involve the primary node establishing replication patterns between the two nodes. The collaboration functionality itself may be described through a series of XML (i.e. metalanguage) definitions and implemented through a structured activity manager.

The method may involve deploying the secondary node into the physical environment. For both nodes, the method may involve modifying the collaboration features and structures via updated template definitions. The method may involve decommissioning or repurposing the secondary node when no longer required. The addition and removal of platform and micro-services or entire nodes may be done through XML definitions.

According to another aspect of the present invention, there is provided a method for establishing a secure data communications connection between collaborating nodes in a network, the method including:

replicating data and associated metadata, and/or security contextual information between the nodes so that the nodes are configured to securely search content across the network;

wherein each node is virtual and includes an automated controller configured such that the stand-up and configuration of each node is a fully automated process standing up and coupling multiple nodes together, each node once stood-up able to locate other nodes on the network.

Any of the features described herein can be combined in any combination with any one or more of the other features described herein within the scope of the invention.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

Figure 1:
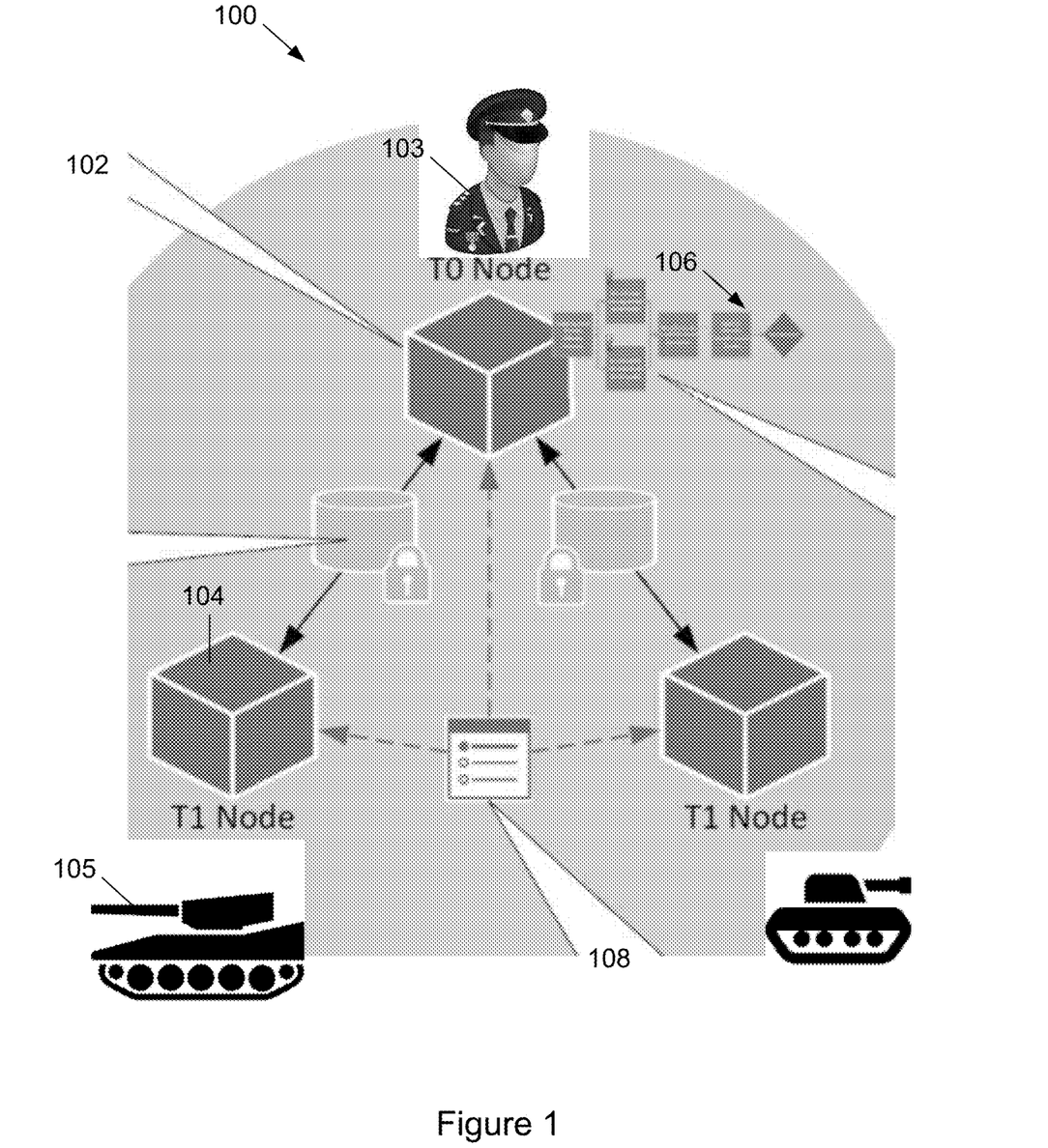
FIG. 1 is a schematic block diagram of a military data communications network in accordance with an embodiment of the present invention.

According to an embodiment of the present invention, there is provided a secure collaborative data communications network 100 for military operations as shown in FIG. 1. The network 100 includes a division (i.e. primary) node 102, associated with a military division 103 (i.e. primary entity). The division node 102 enables collaboration of features and structure of a battalion (i.e. secondary) node 104 using a template arrangement. The battalion node 104 is associated with a battalion 105 (i.e. secondary entity) under control of the division 103. The battalion node 104 replicates the collaboration features and structure from the division node 102. The secondary nodes 104 below the primary 104 may be configured as a 'mesh' style network to share information collaboratively within the network 100.

Advantageously, the division node 102 enables collaboration features and structure of the battalion node 104 using the template arrangement and the battalion node 104 replicates that collaboration. This automated process is far more rapid (e.g. 3 hours) when compared with manually and independently configuring both nodes 102, 104 from scratch (e.g. 3 months). The ability to provide a rapid response through templated processes, at all levels of the delivered service (from compute and store, though network, data and application and presentation layers) does not currently exist. The nodes represent encapsulated security boundaries making them suitable for inter-agency low trust scenarios.

Furthermore, replicating to ensure that the collaboration of features and structure is common among the nodes 102, 104, avoids compatibility and interoperability problems among nodes 102, 104 in the network 100. Each node 102, 104 defines an entire set of OSI layers, not just one or two, to provide a fully automated environment. So, the definition of each node 102, 104 includes all layers of the OSI model, plus the ability to configure data to support enterprise information management through a centralized point, fed by distributed data implementation. The standard business processes, documents, document templates, applications and other artefacts required to support these operations and investigations are encapsulated within standard template definitions of the template arrangement to allow for rapid instantiation and standardization across data repositories.

The replicated features and structure relate to operational processes 106 of the nodes 102, 104. In this manner, the nodes 102, 104 of the federated network 100 can act autonomously in the event of a communications breakdown as the entirety of an application stack of each node 102, 104 operates independently.

In particular, the battalion node 104, once established, may operate autonomously from the division node 102. If disconnection from the division node 102 occurs, the battalion node 104 operates independently and when connectivity is reestablished, all information and application and environment changes that have occurred during the period of disconnection will be automatically synchronized with the division node 102. The network 100 is configured to automatically apply metadata to data in nodes 102, 104 using contextual information and/or metadata rules. The network 100 is further configured to replicate the data, associated metadata and/or security context between the nodes 102, 104 so that the nodes 102, 104 are configured to securely search content across the nodes 102, 104 in the network 100. Maintaining the security context of information across the nodes 102, 104 in this manner results in the successful operation of the node network 100 as a whole. The term network 100, as used above, is not referring to a physical network but rather an information network created through an awareness and interoperability of nodes.

In the prior art, each network node was instead unaware of other nodes in the network 100, essentially making secure collaboration and content creation largely a discrete activity within a specific node. Having seamless access to information on separate node locations was very difficult or impossible due to the different security contexts of a specific piece of information or a document. The preferred embodiment ensures that any piece of information stored on a node 102, 104 maintains its security context throughout the network 100, thus making seamless collaboration on content possible.

The preferred embodiment enables managing content and documents in a secure environment across disparate networks 100, regardless of the physical topology (i.e. computers, bearers (routers/switches/satcoms)). Each 'T' node 102, 104 utilises industry standards, e.g. SAML, XAML, XML, .Net, and standard products (e.g. Commercial off the Shelf—COTS and Military off the shelf—MOTS) in such a way as to provide secure collaboration, document management and automated processes particularly suited for warfighter services.

The structured collaboration environment complies with compliance and organization standards Out of the box—OOTB which is a key differentiator to standard SharePoint (Microsoft product) or Standard CMS functionality (e.g. Oracle CMS). The environment also supports very complex business processes without any code being written or customizations being made. These processes relate to site structures (e.g. lists, libraries, calendars, web pages, forms, workflows, third party tools and a variety of other constructs, metadata and autotags)

FIG. 1 shows two 'T' nodes 102, 104, but is fully scalable to form a series of 'T' nodes, starting with a master 'T0' node 102 that anchors the rest of the virtualised network of nodes 104. The next level down is a 'T1' node 104 that can be provisioned as a specific node to service a particular group (e.g. battalion 105) of people with a set of services. These services relate to collaboration and process automation. The operational processes 106 can be 'generated' or 'provisioned' using a provisioning engine, aka activity manager controller 108. The user services are a combination of security, data and application processes fully implementing business processes in a repeatable structured way, and driven through template definitions.

The network provisioning engine 108 supports the following features:

Seamless collaboration across nodes 102, 104 which can collaborate on documents, content (including web pages, calendars etc);

Secure content and information sharing in a secure way across 'T' nodes 102, 104;

Each node 102, 104 can easily scale in terms of the number of users accessing the services by scaling the hardware around the solution; and Each node 102, 104 can be quickly and easily provisioned using automation scripts that provide a combination of provisioning of services combined with a specific configuration to enable a node 102, 104 to operate within a context of a network of other nodes 102, 104.

A Node 102, 104 is not simply a dumb collection of services. The node102, 104 itself has services, data and security context to allow it to operate within a broader context. A node 102, 104 can be a combination of compute/store and applications/services implemented on any operating system technology baseline (windows/linux etc).

The network 100 also includes a templating engine, using a template definition of processes, to automatically create requirements to provide collaboration features and structure. The template defines everything from the platform layer (compute, datastore and network—collectively referred to as platform) through to the application and presentation layer. The template defines the required structures, and the templating engine provides the instantiation capability of the platform, the applications and the platform services, including micro-services. This template arrangement is far more efficient than instead relying on an individual's ability to translate operational requirements into a technical specification that are then manually coded in the prior art. The templating arrangement creates features and structure that automatically fit within the broader network design. The templates are complete XML encapsulations of microservices, apps, document libraries, forms and workflows or any other application services and presentation layer objects.

The templates are layered, and top level templates define the operating environment, including network, compute and store. The next layer of templates describe complete business operating environments, including business processes, apps, collaborative content across documents and lists.

Templating involves:
a. encoding the node requirements into a set of template definitions,
b. using the inputs to the templating engine to create the users structured collaboration environment; and
c. ability to support all layers of the OSI model from database through to presentation layer, including platform services, storage services, network services etc. Specifically, complete business processes including data capture, data storage, data processing and data presentation. Further, data aggregation and batch processes can be defined as part of the templates.

The structured collaboration environment sits within an over-arching design of the 'T' nodes 102, 104 that supports the creation of structured collaboration for any given set of user requirements. The 'T' node configuration automatically recognises the security context and content of the provisioned division warfighter services and provides full information flow of collaboration and process automation content across the 'T' node network 100.

Figure 2A:
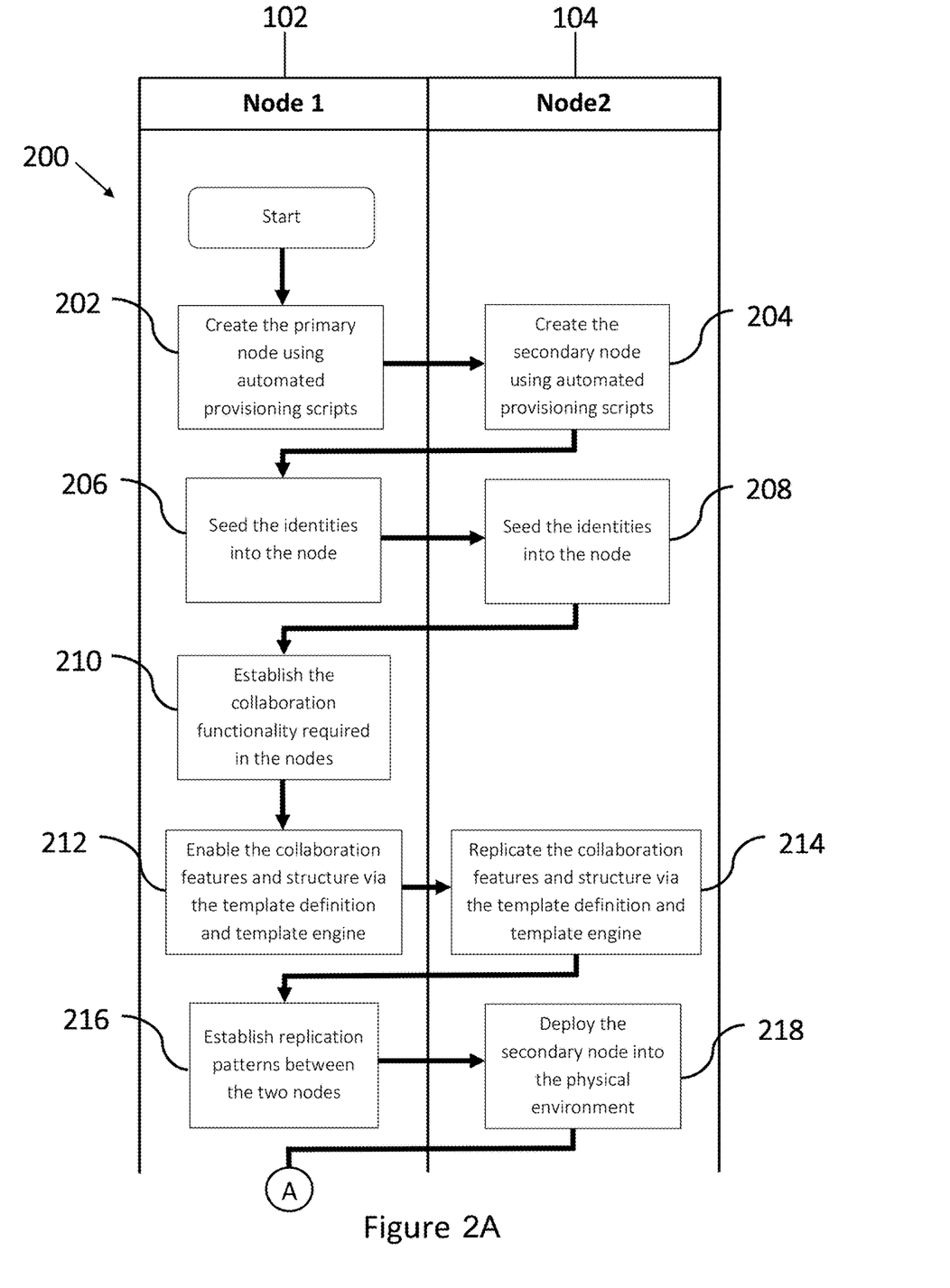
FIGS. 2A and 2B are a flowchart showing a method for establishing a secure data communications connection between collaborating primary and secondary nodes in the network of FIG. 1.
Figure 2B:
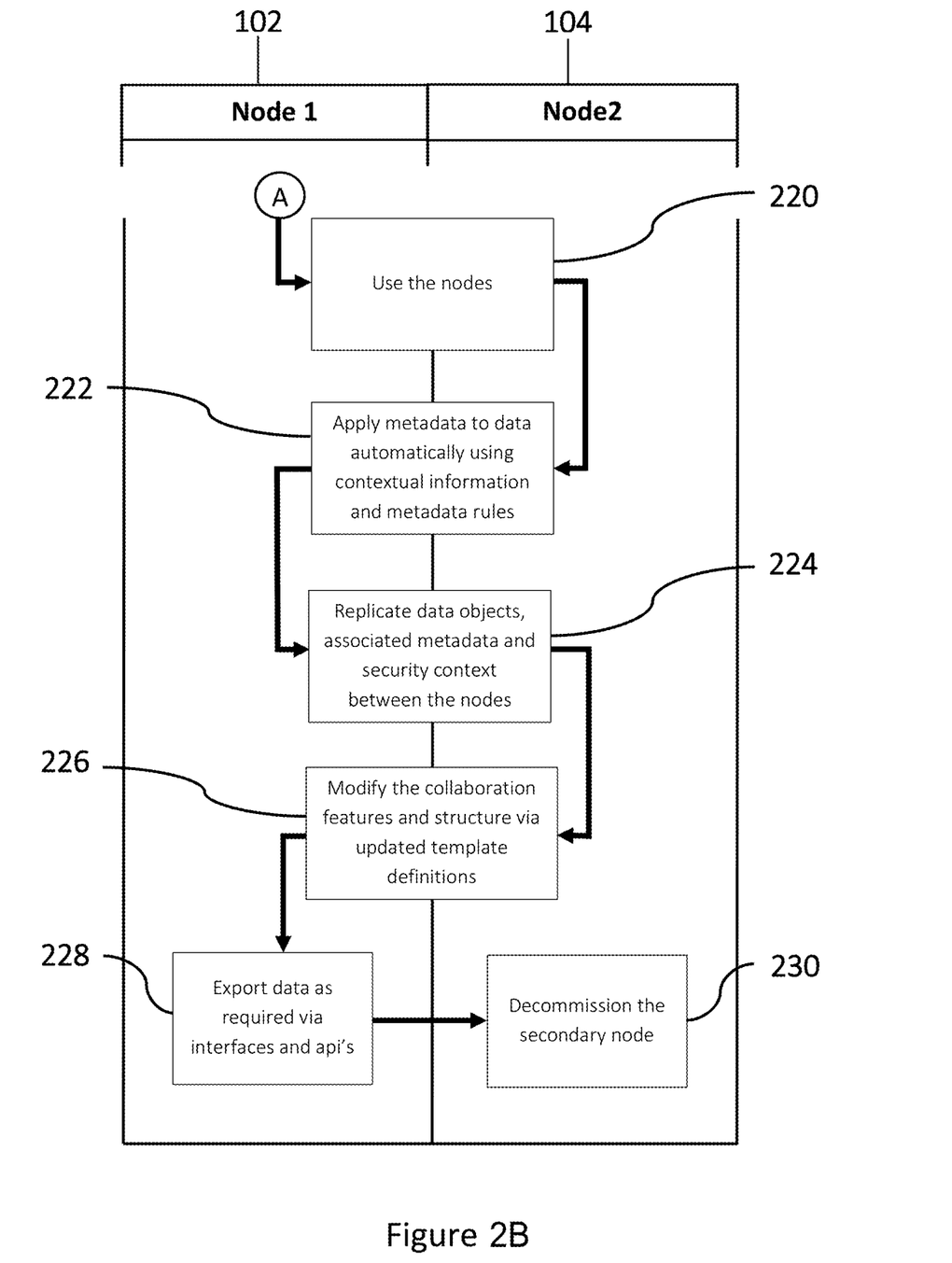

An automated method 200 for establishing a secure data communications connection between the collaborating division and battalion nodes 102, 104 is now described with reference to FIGS. 2A and 2B. Communication is this sense is not dealing with voice and network communications, it is referring to the collaboration content (lists, libraries, documents, calendars, forms, workflows and other objects).

At step 202, the method 200 initially involves creating the division node 102 using automated provisioning scripts. The division node 202 is stood up for a division 103.

At step 204, the method 200 also involves creating the battalion node 104 using automated provisioning scripts. The battalion node is stood up for a battalion 105 to collaborate with the division node 202 of the division 103.

At step 206, the method 200 involves seeding user identities into the division node 102. In particular, users for the division 103 are populated into the division node 102.

At step 208, the method 200 involves seeding user identities into the battalion node 104. In particular, users for the battalion 105 are populated into the battalion node 104.

At step 210, the division node 102 establishes collaboration functionality between the division node 102 and battalion node 104. In particular, the battalion node 104 receives input from the node administration team based upon how and why the division 103 and battalion 105 are collaborating. The collaboration functionality itself is described through a series of XML (i.e. metalanguage) definitions and implemented through a structured activity manager.

At step 212, the division node 102 enables collaboration of features and structure via the template definition and template engine. In particular, the created collaboration structures allow for collaboration with the battalion 105 around an exercise.

At step 214, the battalion node 104 replicates the collaboration of features and structure from the division node 102 via the template definition and template engine.

At step 216, the division node 102 establishes replication patterns between the two nodes 102, 104. In particular, replication of data between the division 103 and battalion 105 is established.

At step 218, the method 200 involves deploying the battalion node 104 into the physical environment. In particular, the battalion node 104 is deployed to the battalion 105.

At step 220, the method 200 involves using the division node 102 and battalion node 104 by the respective division 103 and battalion 105.

At step 222, the method involves automatically applying metadata to data in both nodes 102, 104 using security contextual information and metadata rules. When loading documents into the nodes 102, 104, metadata are applied to the nodes 102, 104 based on content including who created the document, what the document is about and where the document is saved. The metadata provides description and contextual information around all objects and components of a node 102, 104, and includes security, information management descriptors and classification data.

At step 224, the method 200 involves replicating the data, associated metadata and security context between the nodes 102, 104. Data received by the nodes 102, 104 is replicated between the division 103 and battalion 105. The nodes 102, 104 are thereby configured to securely search content across all nodes forming part of the overall network 100.

At step 226 and for both nodes, the method 200 involves modifying the collaboration features and structure via updated template definitions. During the life of the nodes 102, 104, the structures that a division 103 and battalion 105 are collaborating in may change. This change is propagated to the nodes 102, 104 via the defined templates.

At step 228, the division node 102 exports data to external systems via Application Programming Interfaces (APIs) and export mechanisms.

At step 230, the method involves decommissioning or repurposing the battalion node 104 when no longer required. The addition and removal of platform and micro-services or entire nodes 102, 104 is done through XML definitions.

Figure 3:
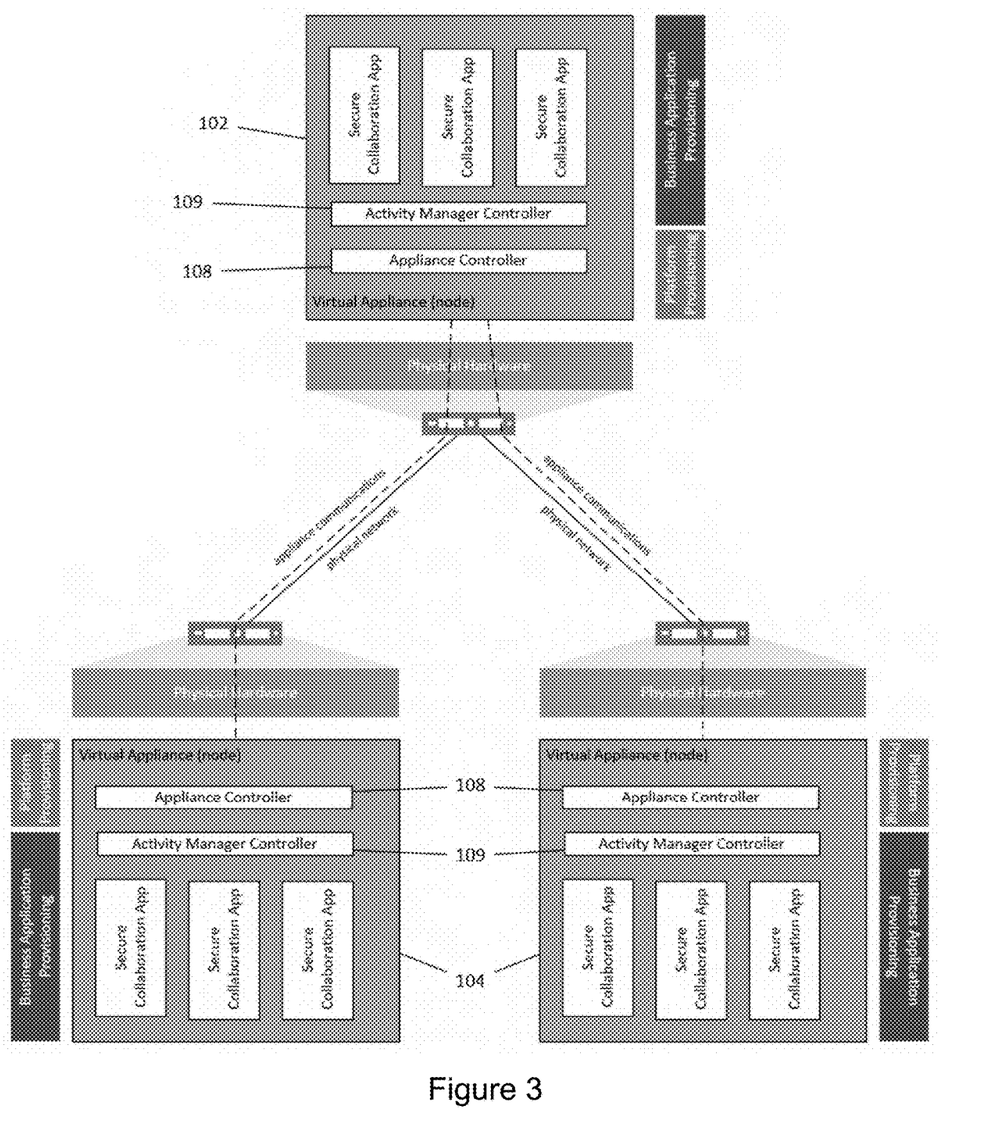
FIG. 3 is a detailed block diagram of the military data communications network of FIG. 1.

FIG. 3 shows a more detailed bock diagram of the secure collaborative data communications network 100. The network 100 and nodes 102, 104 form a series of loosely coupled virtual appliances that are able to provide end user collaboration services that are highly secure. These appliances have the ability to work together to allow end-user collaboration across disparate physical bearers or physical networks. The appliances operate independently from the physical networks. Advantageously, these appliances operate either as federated collaboration services or as independent collaboration services for end users.

Within the federated virtual appliances (nodes) 102 and 104, the stand-up and configuration of each node 102, 104 is a fully automated process standing up multiple components that would otherwise typically be done independently of each other using manual (people) processes. Advantageously, the nodes 102 and 104 are coupled together to provide a seamless virtual appliance through an automated software controlled process 108. Each virtual appliance (node) 102, 104 once stood up, can then discover the other virtual appliances (nodes) 102, 104 that exist on the same physical network to form a set of loosely coupled appliances. Furthermore once a virtual appliance has been stood-up, secure collaborative business "apps" can be automatically deployed on to the virtual appliance (node) 102, 104 using XML based templates that define the application and are propagated from a centralised virtual appliance (node) 102, 104.

Known alternative networks are limited in the fact that they are relevant to single node components in the network or hardware layer of the OSI Model. The present network configuration relates to layers above the Network and Hardware layers. Elaborating further, configuration files presented in art pertain simply to device configuration data, whereas the present embodiment involves the use of XML based templates define Services, Applications, Data Structures, Business Applications. These xml templates also contain Business Data in the form of Office Documents, Videos, Electronic forms and workflows, which underpin and support a business activity or a collection of business process.

Within each virtual appliance (node) 102, 104 an activity manager controller 109 is a core component which can create secure collaboration apps based on a template defined in XML. This advanced technique creates not just an app that end-users collaborate through, but can also populate in business data (in the form of documents, videos, pdfs, etc), and ensure user created data is also tagged correctly as the activity manager controller 109 understands the context of the data (location, business activity, business process, person creating it, type of data and security context) and hence can apply extensive metadata or tags to the data. The activity manager controller 109 is not just able to provision or create an application, but also manage and update the applications from a central location.

Each virtual appliance (node) 102, 104 can also operate independently or as part of a loosely coupled federated set of appliances when a physical network is present. When a network is not present each node 102, 104 can operate independently and continue to provide access to the hosted collaborative applications 102, 104 and content hosted on the virtual appliance (node) 102, 104. Data exchange can also occur without a physical network connection, e.g. via USB or hard drive data exchange, thus allowing the 'network of devices' to continue operating without physical connectivity. Advantageously, this feature removes the dependency on a working set of physical bearers (comms devices) and further allows 'air gapping' across physical networks, which can exist on different security domains (e.g. secret/top secret). In contrast, known systems cannot operate independently and are tightly coupled to ensure they operate as expected.

A differentiation of the present embodiment over other similar methods is that the automation of the provisioning is focused on the deployment of the virtual appliance (node) 102, 104 on top of a physical platform, rather than the provisioning of the platform or underpinning network components. The provisioning then goes on to create business applications within the virtual appliance (node). The data can then be replicated from one node to another if a network is available. If no network is present then each virtual appliance will operate autonomously.

Whilst known systems are focused on the physical infrastructure and networks, the present embodiment instead focuses on the provisioning of a virtual appliance that would sit on top of the physical servers and networks referenced. This virtual appliance has the ability to then create business applications within the virtual appliance based on templates that define the business application as well any seed user data (e.g. documents) required by the business application.

Within a node (and each node) 102, 104, there is provided a unique ability to automate the creation of an end to end business process, encapsulating all aspects of the apps, data and workflow interconnectivity between apps that does not exist elsewhere.

A person skilled in the art will appreciate that many embodiments and variations can be made without departing from the ambit of the present invention.

The present invention has application for emergency service entities and other entities having a chain of command. In the case of national security and policing, the nodes 102, 104 can be defined in such a way that they are aware of each other and automatically enable or disable platform and micro-services accordingly so that the nodes 102, 104 collectively operate to provide a complete secure information environment, even within poorly connected or disconnected environments.

In one embodiment, the provisioning engine 108 and activity manager controller 109 may be incorporated as the same entity.

In compliance with the statute, the invention has been described in language more or less specific to structural or methodical features. It is to be understood that the invention is not limited to specific features shown or described since the means herein described comprises preferred forms of putting the invention into effect.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

What is claimed is:

1. A secure collaborative data communications network including:
   a primary node, associated with a primary entity, and configured to enable collaboration of features or structure of a secondary node using a template arrangement;
   a secondary node, associated with a secondary entity under control of the first primary entity, and configured to replicate the collaboration of features or structure from the primary node; and
   wherein each node is virtual and includes an automated controller configured such that the stand-up and configuration of each node is a fully automated process standing up and coupling multiple nodes together, each node once stood-up is able to locate other nodes on the network; and
   wherein each one of the virtual nodes is configured to operate:
      as part of a coupled federated set of nodes when connected to the network; and
      independently and continue to provide access to hosted collaborative applications and content hosted on the virtual node when the virtual node is not connected to the network.

2. A network as claimed in claim 1, wherein once a node has been stood-up, secure collaborative business applications can be automatically deployed on to the node using XML based templates, the templates defining the application and being propagated from a centralised node.

3. A network as claimed in claim 2, wherein the nodes are implemented in one or more layers above the hardware layer of the OSI Model, and wherein the XML based templates define Services, Applications, Data Structures, Business Applications, and/or Business Data in the form of Office Documents, Videos, Electronic forms and workflows, which underpin and support a business activity or a collection of business processes.

4. A network as claimed in claim 1, wherein each virtual node includes an activity manager controller configured to create secure collaboration applications based on a template defined in XML, the applications configured to enable end-user collaboration and population of business data.

5. A network as claimed in claim 4, wherein the activity manager controller is configured to ensure user created data is tagged correctly by applying metadata or tags to the user created data.

6. A network as claimed in claim 4, wherein the activity manager controller is configured to provision or create an application, as well as manage and update the application from a central location.

7. A network as claimed in claim 1, wherein each virtual node is configured to operate
   independently of one another when connected to the network; and
   autonomously of one another when not connected to the network.

8. A network as claimed in claim 1, wherein each virtual node defines all layers of the OSI model and the ability to configure data to support enterprise information management through a centralized point, fed by distributed data implementation; and wherein standard business processes, documents, document templates, applications and other artefacts required to support operations and investigations are encapsulated within standard template definitions of the template arrangement to allow for rapid instantiation and standardization across data repositories.

9. A network as claimed in claim 1, wherein the features or structure of each one of the virtual nodes relate to operational processes of the virtual nodes, and wherein the network is not a physical network, but is an information network created through an awareness and interoperability of the virtual nodes.

10. A network as claimed in claim 1, wherein the virtual nodes of the network act autonomously in the event of a communications breakdown as the entirety of an application stack of each virtual node operates independently.

11. A network as claimed in claim 1, wherein:
   the secondary node, once established, operates autonomously from the primary node; and
   if disconnection from the primary node occurs, the secondary node operates independently and when connectivity is reestablished, all information and application and environment changes that have occurred during the period of disconnection will be automatically synchronized with the primary node.

12. A network as claimed in claim 1, configured to automatically apply metadata to data in both nodes using security contextual information and/or metadata rules, the metadata providing description and contextual information around all objects and components of a node, including security, information management descriptors and classification data.

13. A network as claimed in claim 12, wherein the network is configured to replicate the data and the associated metadata, and/or security contextual information between the nodes so that the nodes are configured to securely search content across other nodes.

14. A network as claimed in claim 1, wherein the template arrangement includes a templating engine for using a template definition to automatically create the features or structure, the template definition including from the platform layer through to the application and presentation layer of the OSI model, the templating engine providing the instantiation capability of a platform, applications and platform services including micro-services.

15. A network as claimed in claim 1, further including a provisioning engine configured for provisioning operational processes to facilitate collaboration, sharing, scaling and/or configuring among the nodes.

16. A method for establishing a secure data communications connection between collaborating primary and secondary nodes, the method including the steps of:
   configuring the primary node to associate the primary node with a primary entity, and to enable collaboration of features or structure of the secondary node using a template arrangement; and
   configuring the secondary node to associate the secondary node with a secondary entity under control of the first entity, and to replicate the collaboration of features or structure from the primary node;
   wherein each node is virtual and includes an automated controller configured such that the stand-up and configuration of each node is a fully automated process standing up and coupling multiple nodes together, each node once stood-up able to locate other nodes on the network; and
   wherein the secondary virtual node operates autonomously from the primary virtual node;
   wherein the secondary virtual node operates independently from the primary virtual node when the secondary virtual node is disconnected from the primary virtual node; and
   wherein changes to the secondary virtual node that have occurred when disconnected from the primary virtual node are automatically synchronized with the primary virtual node when connectivity with the primary virtual node is reestablished.

17. A method as claimed in claim 16, wherein the steps are automated and wherein the template arrangement is comprised of a templating engine using a template definition configured with, business processes, applications, document libraries, document templates, documents and collaborative content.

18. A method as claimed in claim 16, further involving:
   a step of automatically applying metadata to both nodes using contextual information and/or metadata rules;
   replicating data objects, associated metadata and/or security context between the nodes so that the nodes are configured to securely search content across other nodes;
   creating the primary node using automated provisioning scripts; creating the secondary node using automated provisioning scripts;
   seeding user identities into the primary node;
   seeding user identities into the secondary node;
   the primary node establishing collaboration functionality between the primary and secondary nodes,
   the collaboration functionality being described through a series of metalanguage definitions and implemented through a structured activity manager;
   the primary node establishing replication patterns between the two nodes;
   deploying the secondary node into the physical environment;
   for both nodes, modifying the collaboration of features or structure via updated layered template definitions; and/or
   decommissioning or repurposing the secondary node when no longer required through metalanguage definitions.

* * * * *